United States Patent
Qin et al.

(10) Patent No.: US 8,848,127 B2
(45) Date of Patent: Sep. 30, 2014

(54) LIQUID CRYSTAL PANEL, MANUFACTURE METHOD AND REPAIR METHOD THEREOF

(75) Inventors: Wei Qin, Beijing (CN); Zhilong Peng, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 175 days.

(21) Appl. No.: 13/381,022

(22) PCT Filed: Mar. 24, 2011

(86) PCT No.: PCT/CN2011/072107
§ 371 (c)(1),
(2), (4) Date: Dec. 27, 2011

(87) PCT Pub. No.: WO2011/131072
PCT Pub. Date: Oct. 27, 2011

(65) Prior Publication Data
US 2012/0105758 A1    May 3, 2012

(30) Foreign Application Priority Data

Apr. 19, 2010  (CN) .......................... 2010 1 0154118

(51) Int. Cl.
*G02F 1/1333*  (2006.01)
*G02F 1/13*  (2006.01)

(52) U.S. Cl.
CPC ............ *G02F 1/1309* (2013.01); *G06F 1/1345* (2013.01)
USPC ................. 349/54; 349/149; 349/42; 349/62; 345/55; 445/24; 438/15

(58) Field of Classification Search
CPC ............................ H01L 2224/74; G09G 3/36
USPC .......................... 349/54, 149, 42; 345/104, 54
See application file for complete search history.

(56) References Cited

U.S. PATENT DOCUMENTS 6,111,621 A *  8/2000  Kim et al. ........................ 349/54
6,943,374 B1 *  9/2005  Park ................................ 257/72

(Continued)

FOREIGN PATENT DOCUMENTS

CN    1447637 A    10/2003
CN    1787217 A    6/2006

(Continued)

OTHER PUBLICATIONS

International Preliminary Report on Patentability; dated Oct. 23, 2012; Appln. No. PCT/CN2011/072107.

(Continued)

*Primary Examiner* — Edward Glick
*Assistant Examiner* — Sang V Nguyen
(74) *Attorney, Agent, or Firm* — Ladas & Parry LLP

(57) ABSTRACT

An embodiment of the invention provide a liquid crystal panel comprising a driving chip assembly comprising: a chip lead wiring and a chip repair line, which are overlapped but insulated from each other; an array substrate comprising an array substrate lead wiring and an array substrate repair line, which are overlapped but insulated from each other; wherein the driving chip assembly is mounted on the array substrate which is electrically connected with the corresponding chip lead wiring connection, and the two ends of the chip repair line is electrically connected with the corresponding two ends of the array substrate repair line respectively.

19 Claims, 9 Drawing Sheets

(56) References Cited

U.S. PATENT DOCUMENTS

| | | | |
|---|---|---|---|
| 7,142,263 B2* | 11/2006 | Nagata | 349/54 |
| 7,358,534 B2* | 4/2008 | Park | 257/72 |
| 2001/0026345 A1 | 10/2001 | Park et al. | |
| 2003/0179158 A1* | 9/2003 | Sakaki | 345/55 |
| 2006/0124966 A1* | 6/2006 | Oh et al. | 257/202 |
| 2007/0206126 A1* | 9/2007 | Lin et al. | 349/54 |
| 2009/0284679 A1* | 11/2009 | Kim et al. | 349/54 |

FOREIGN PATENT DOCUMENTS

| | | |
|---|---|---|
| CN | 101211026 A | 7/2008 |
| JP | 2006-019415 A | 1/2006 |
| TW | 200417961 A | 9/2004 |

OTHER PUBLICATIONS

International Search Report: mailed Jun. 30, 2011; PCT/CN2011/072107.

* cited by examiner

LIQUID CRYSTAL PANEL, MANUFACTURE METHOD AND REPAIR METHOD THEREOF

TECHNICAL FIELD

Embodiments of the present invention relate to a liquid crystal panel for a thin film transistor liquid crystal display (TFIT-LCD).

BACKGROUND

During the producing process of TFT-LCDs, it is necessary to connect the lead wirings on the array substrate (i.e., array substrate lead wirings, including gate lead wirings, data lead wirings, etc) and the lead wirings on the driving chip assembly (i.e., chip lead wirings) to achieve the control over the liquid crystal display. The driving chip assembly may be a chip on film (COF) or a chip on glass substrate (COG), etc.

An open failure at the connection between the driving chip assembly and the array substrate (i.e., the connection position of the driving chip assembly) is a kind of frequent failures and may be classified into three types according to the open positions: 1) the disconnections of the array substrate lead wirings are mainly caused by the dusts during the array process, the crush of the foreign matters during the process of cell formation, water vapor corrosion during the post engineering, etc; 2) the disconnections of chip lead wirings are mainly caused by the scratch by the edges of the thin film driving chip assembly and the glass substrate; and 3) the disconnections of the electric connection position of the chip lead wirings and the array substrate lead wirings are mainly caused by metallic corrosion, dusts, lack of the conductive particles, etc. at the via hole positions. If the various open failures mentioned above cannot be repaired, the liquid crystal panel would become a waste product.

There are methods for repairing open failures in a liquid crystal panel at present. FIG. 1 is a conventional repair structure for the open failure of the pixel area, in which the repair lines 1 for the pixel area enclose the pixel area in a circle, and these repair lines 1 for pixel area are overlapped with both the gate lead wirings 3 and the data lead wirings 2. The gate lead wirings 3 and the data lead wirings 2 are crossed in the pixel area to define the pixel array arranged in a matrix. As shown in FIG. 2, when an open position 17 is on one data lead wiring 2, a welding process can be performed at the overlapped positions of a repair line 1 for pixel area with the data lead wiring 2, such that the data line signals corresponding to the open position can be transferred through the repair line 1 for pixel area to achieve a normal display.

However, the inventors found that all the existing techniques for repairing open failures in a liquid crystal panel cannot be used for repairing open failures of the connection position of the driving chip assembly. Thus the traditional open failure of the connection position of the driving chip assembly cannot be repaired, and once it appears, the product has to be treated as a waste product.

SUMMARY

An embodiment of the invention provides a liquid crystal panel comprising a driving chip assembly comprising a chip lead wiring and a chip repair line, which are overlapped but insulated from each other; an array substrate comprising an array substrate lead wiring and an array substrate repair line, which are overlapped but insulated from each other; wherein the driving chip assembly is mounted on the array substrate, the array substrate lead wiring and the corresponding chip lead wiring are connected electrically, and the two ends of the chip repair line are electrically connected with the two ends of the corresponding array substrate repair lines respectively.

Another embodiment of the invention provides a method of manufacturing liquid crystal panel comprising: forming an array substrate lead wiring and an array substrate repair line on an array substrate, wherein the array substrate repair line is overlapped with the array substrate lead wiring but insulated therefrom; forming a chip lead wiring and a chip repair line on a driving chip assembly, wherein the chip repair line is overlapped with the chip lead wiring but insulated therefrom; and mounting the driving chip assembly on the array substrate to form an electrical connection between the two ends of the array substrate repair line and the corresponding two ends of the chip repair line and the electrical connection of the array substrate lead wiring and the chip lead wiring is formed.

Still another embodiment of the invention provides a method for repairing an open failure of a connection position of the driving chip assembly of the liquid crystal panel described above.

DETAILED DESCRIPTION

A liquid crystal panel, a manufacturing method thereof and a repairing method thereof of the embodiments of the invention will be described in detail in conjunction with the accompanying drawings.

A liquid crystal panel of an embodiment of the invention comprises a driving chip assembly comprising a chip lead wiring and an array substrate comprising an array substrate lead wiring, and the chip lead wiring is electrically connected with the corresponding array substrate lead wiring. This liquid crystal panel further has repair lines which comprise a chip repair line which is located on the driving chip assembly and overlapped with the chip lead wiring but insulated therefrom, and an array substrate repair line which is located on the array substrate and overlapped with the array substrate lead wiring but insulated therefrom, and the two ends of the chip repair line are electrically connected with the corresponding two ends of the array substrate repair lines.

The liquid crystal panel of an embodiment of the invention has a chip repair line and an array substrate repair line. The open failure of the connection position of the driving chip assembly in the liquid crystal panel can be repaired by welding the overlapped position of the repair lines with the corresponding lead wirings.

Embodiment 1

Figure 1:
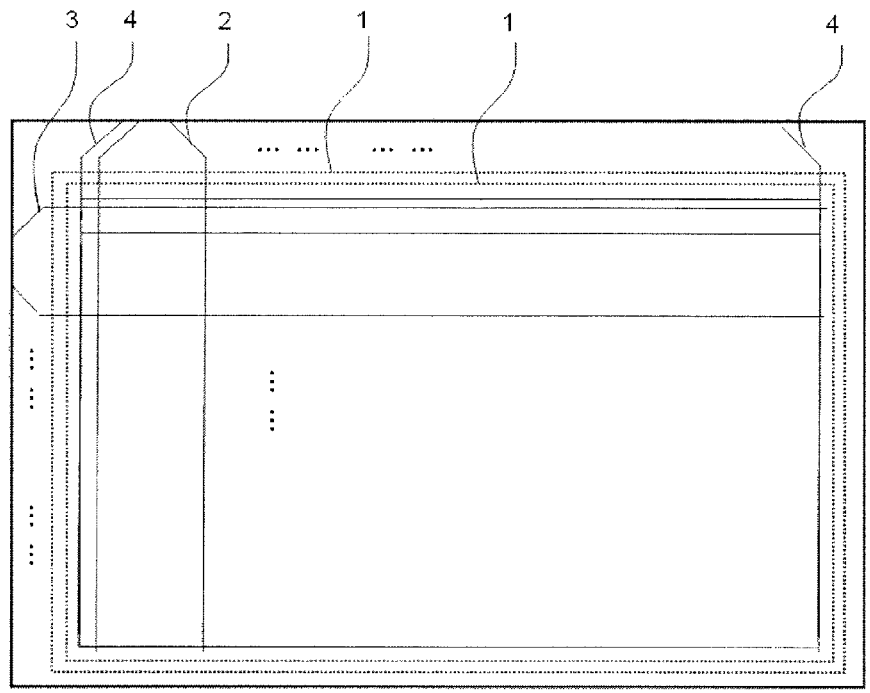
FIG. 1 is a schematic plan structure view of a repair structure of a pixel area in a traditional liquid crystal panel.
Figure 2:
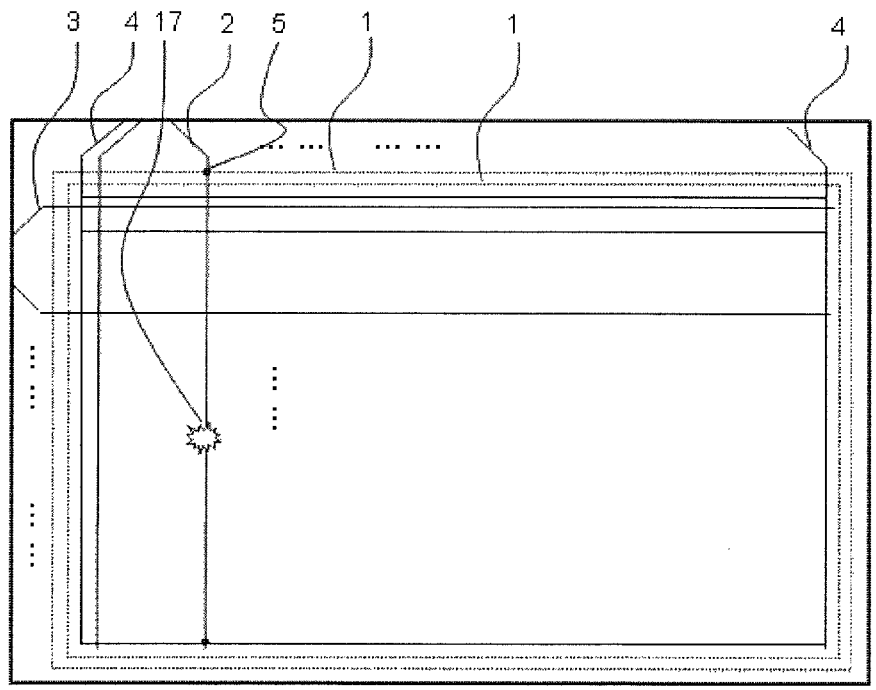
FIG. 2 is a schematic view of a repairing method when the open failure of the pixel area in the liquid crystal panel of FIG. 1 occurs.
Figure 3:
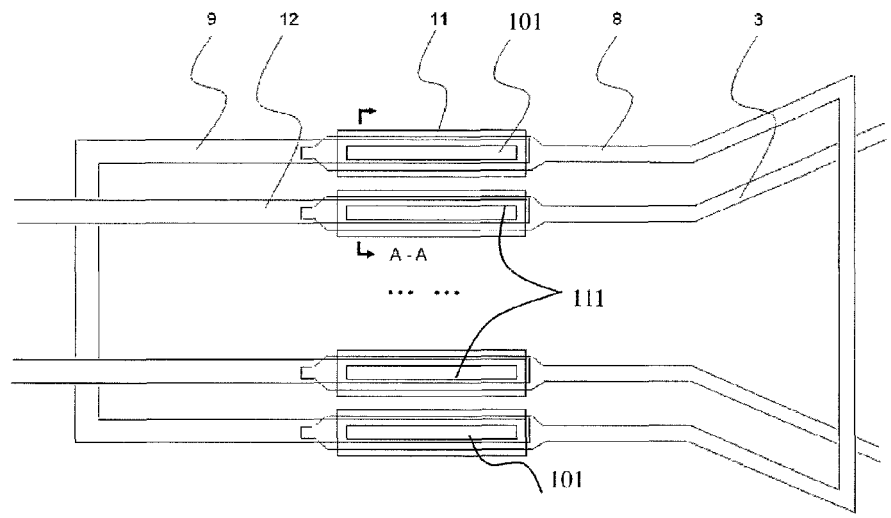
FIG. 3 is a schematic top structure view of a connection position of the driving chip assembly in liquid crystal panel of the embodiment 1 of the invention.
Figure 4:
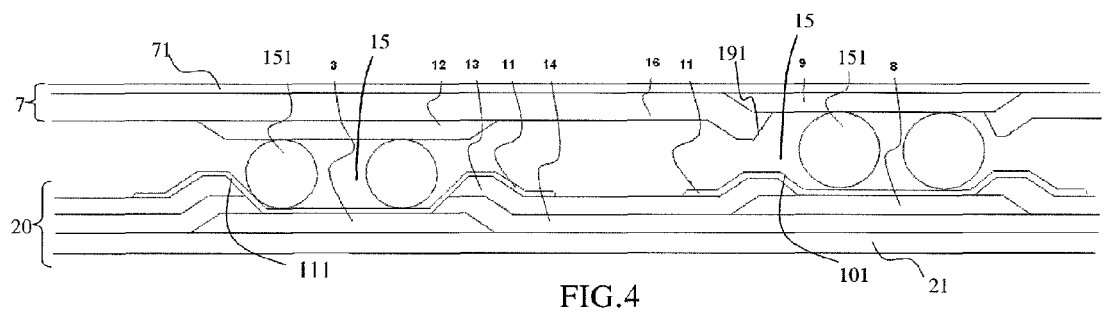
FIG. 4 is a schematic cross sectional structure view taken from the A-A position in FIG. 3.

FIG. 3 and FIG. 4 show a liquid crystal panel of the embodiment of the invention, which comprises a driving chip assembly and an array substrate.

FIG. 3 is a schematic top structure view of a connection position of the driving chip assembly in liquid crystal panel of the embodiment 1 of the invention. FIG. 4 is a schematic cross sectional structure view taken from the A-A position in FIG. 3.

A driving chip assembly 7 comprises a chip substrate 71, on which are provided chips (not shown) and a chip repair line 9. The chip repair line 9 are covered with a chip insulation layer 16 (FIG. 4), on which there is a chip lead wiring 12 connected with the chip. The chip repair line 9 is overlapped with the chip lead wiring 12 (FIG. 3), and they are insulated from each other by the chip insulation layer 16 which is formed between and separate them. A via hole 191 is formed in the chip insulation layer 16 above the end of the chip repair line 9, such that the end of the chip repair line 9 is exposed. Apparently, the driving chip assembly 7 may also adopt such structure as: the chip lead wiring 12 is below the chip insulation layer 16 and may be exposed partially through the via hole, while the chip repair line 9 is above the chip insulation layer 16, the chip repair line 9 is overlapped with the chip lead wiring 12, and they are insulated from each other by the chip insulation layer 16 which is between and separate them.

Figure 4A:
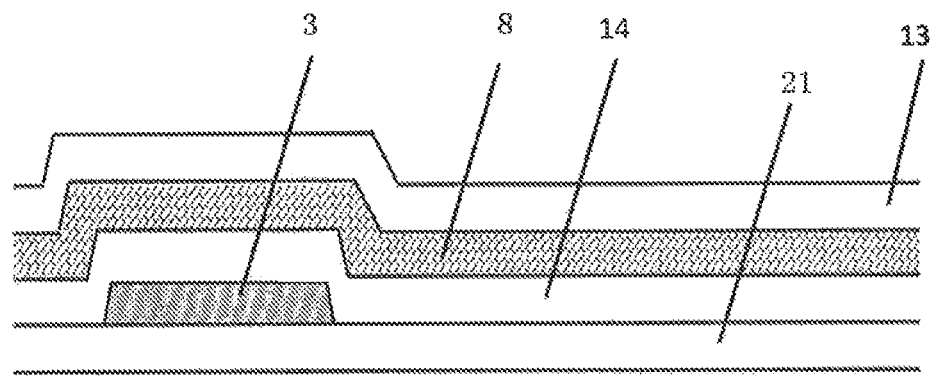
FIG. 4a and FIG. 4b are schematic cross sectional structure of an array substrate, respectively.
Figure 4B:
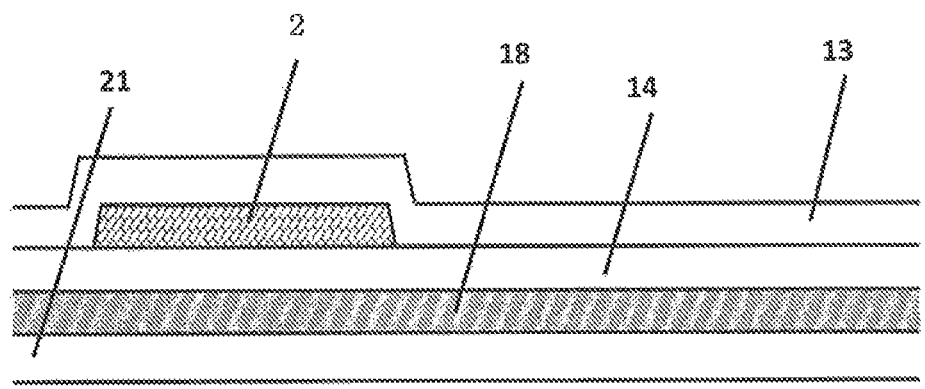

FIG. 4a and FIG. 4b are schematic cross sectional structure of an array substrate, respectively. In the embodiment, on the base substrate 21 of the array substrate 20, array substrate lead wirings comprise a gate lead wiring 3 and a data lead wiring 2. The gate lead wiring 3 is electrically connected with the chip lead wiring 12 on the driving chip assembly 7. Here, the driving chip assembly 7 is a gate electrode driving chip assembly; a gate insulation layer 14 is on the gate lead wiring 3. Referring FIG. 4a as well as FIG. 4b, the data lead wiring and a gate lead wiring repair line 8 are located on the gate insulation layer 14 and in the same layer, and may be formed by a same patterning process (an example of the patterning process may include photolithography process and chemical corrosion process). The gate lead wiring repair line 8 is overlapped with the gate lead wiring 3 and is insulated from the latter by the gate insulation layer 14. A protective layer 13 may be further on the gate insulation layer 14 and the gate lead wiring repair line 8, the protective layer 13 is formed with a via hole 101 at the end of the gate lead wiring repair line 8, a conductive electrode 11 which is connected with the gate lead wiring repair line 8 is provided in the via hole 101, and anisotropic conductive adhesive 15 is applied on the conductive electrode 11 and is connected with the chip repair line 9 on the driving chip assembly 7 so as to achieve the electrical connection of chip repair line 9 and the gate lead wiring repair line 8.

Similarly, above the gate lead wiring 3, a via hole 111 is formed in the protective layer 13, and the conductive electrode 11 connected with the gate lead wiring 3 is formed in the via hole 111, and the anisotropic conductive adhesive 15 is on the conductive electrode 11 and is connected with the chip lead wiring 12 on driving chip assembly 7 so as to achieve the electrical connection of the gate lead wiring 3 and the chip lead wiring 12.

Embodiment 2

Figure 5:
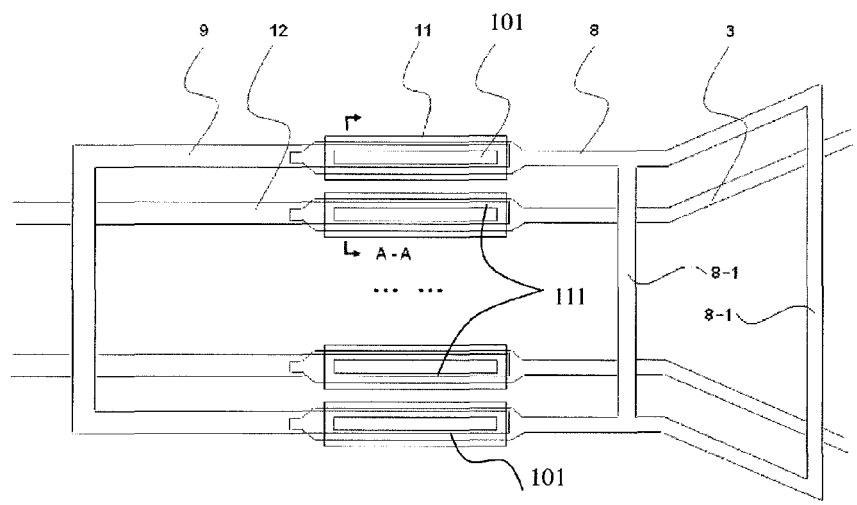
FIG. 5 is a schematic plan structure view of a connection position of a driving chip assembly in liquid crystal panel of the embodiment 2 of the invention.

As shown in FIG. 5, the liquid crystal panel of this embodiment has a similar structure to the liquid crystal panel of the embodiment 1. They differ in that the gate lead wiring repair line 8 on the array substrate 20 comprises two overlapping portions 8-1, which are overlapped with the gate lead wiring 3 but insulated therefrom, and the two ends of the overlapping portions 8-1 are connected respectively, and their common ends are electrically connected with the chip repair line 9; here, if an open occurs between the two overlapping portions 8-1 (i.e. occurs on the array substrate lead wiring), the repairing weld is only performed on the array substrate 20, such that the repairing operation of welding on the driving chip assembly 7 can be avoided, and therefore the possibility that the driving chip assembly 7 is damaged due to welding can be lowered.

Embodiment 3

Figure 6:
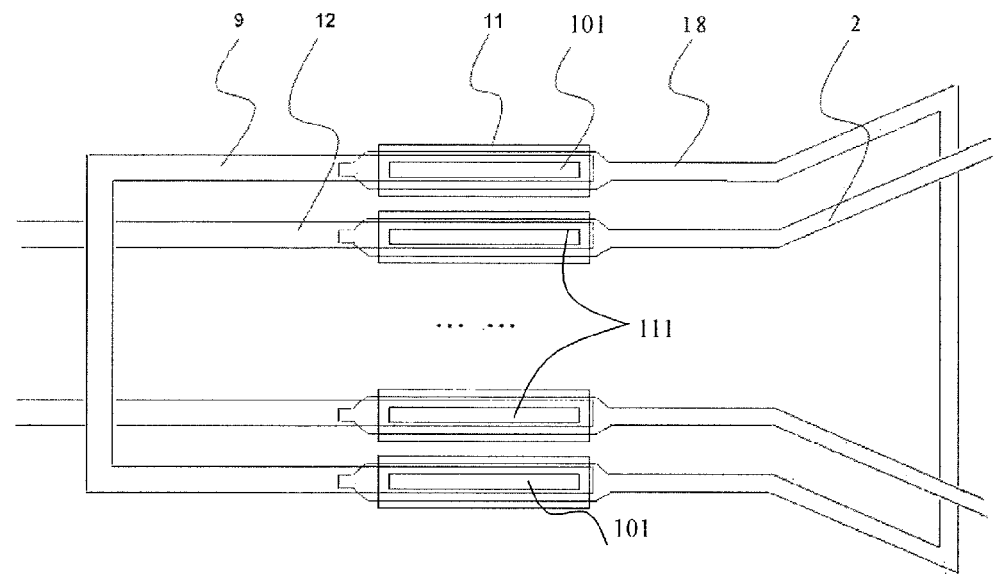
FIG. 6 is a schematic plan structure view of a connection position of a driving chip assembly in liquid crystal panel of the embodiment 3 of the invention.

As shown in FIG. 6, the liquid crystal panel of this embodiment has a similar structure to the liquid crystal panels of the embodiment 1 and the embodiment 2. They differ in that this embodiment is with respect to the connection between the data driving chip assembly in the liquid crystal panel and the data lead wiring on the array substrate, therefore the repair line is the data lead wiring repair line 18, which is located in the same layer as the gate lead wiring 3 when referring FIG. 4a as well as FIG. 4b, and they can be formed in a same patterning process; this data lead wiring repair line 18 is located below the data lead wiring 2 and is insulated from the data lead wiring 2 by the gate insulation layer; the electrical connection of the data lead wiring repair line 18 and the chip repair line 9 on the driving chip assembly 7 may be achieved by the configuration such as the via hole 101, the conductive electrode 11 and the conductive adhesive 15. Here, the driving chip assembly 7 is a data driving chip assembly.

Apparently, similar to the embodiment 2, in this embodiment, the data lead wiring repair line 18 on the array substrate may further comprise two overlapping portions which are overlapped with the data lead wiring 2 but insulated therefrom, the two ends of the two overlapping portion are connected respectively and their common ends again are electrically connected with the chip repair line 9. Here, if an open occurs between the overlapping portions (i.e., occurs on the array substrate lead wiring), the repairing welding is only performed on the array substrate, such that the repairing operation such as welding on the driving chip assembly can be avoided, and therefore the possibility that the data driving chip assembly is damaged due to welding can be lowered.

Embodiment 4

Figure 7:
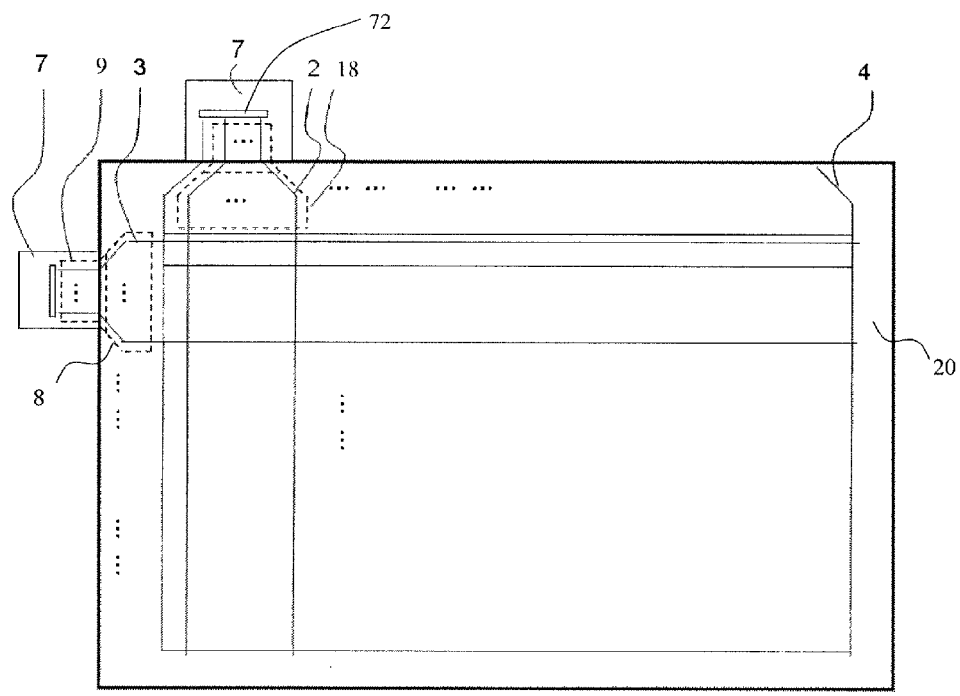
FIG. 7 is a schematic plan structure view of a liquid crystal panel of the embodiment 4 of the invention.

As shown in FIG. 7, the liquid crystal panel of this embodiment has a similar structure to the liquid crystal panels of the embodiment 1 to embodiment 3, has a gate lead wiring repair line for the gate lead wiring and a data lead wiring repair line for the data lead wiring at the same time, thus the combination of the embodiment 1 and the embodiment 3.

An array substrate 20 comprises a plurality of gate lead wirings 3 extending transversely and a plurality of data lead wirings 2 extending longitudinally, which are intersected with each other in pixel area to define a pixel array arranged in a matrix. As shown in FIG. 7, a plurality of driving chip assemblies 7 are provided on the left side of the array substrate 20 for driving the gate lead wirings 3; a plurality of driving chip assemblies 7 are provided on the upper side of the array substrate 20 for the driving the data lead wirings 2. Each driving chip assembly 7 has a corresponding driving chip 72, a chip lead wiring 12 and a chip repair line 9.

On the array substrate 20, the gate lead wiring repair line 8 is located in the same layer as the data lead wirings 2, which may be formed by a same patterning process; while the data lead wiring repair line 18 is located in the same layer as the gate lead wirings 3, which may be formed in a same patterning process. Apparently, both the electrical connection of the data lead wiring repair line 18 with the chip repair line 9 on a driving chip assembly 7 for driving the data lead wirings and the electrical connection of the gate lead wiring repair line 8 with the chip repair line 9 on a driving chip assembly 7 for driving the gate lead wirings may be achieved in a configuration such as the via hole 101, the conductive electrodes 11 and the conductive adhesive 15 as shown in FIG. 4 above.

In the embodiment 1 to embodiment 4, the driving chip assembly 7 may be a chip on film or a chip on glass, etc.

In the embodiment 1 to embodiment 4, there may be one set or more sets of the chip repair lines 9 on a driving chip assembly 7, each of which may be overlapped with one or more chip lead wiring(s) 12. There may be one set or more sets of the repair lines 8 or 18 for the array substrate on the array substrate 20, each of which may be overlapped accordingly with one or more gate lead wiring(s) 3 or data lead wiring(s) 2. The repair lines 9, 8 or 18 may have a single layer structure or a composite layer structure. The repair lines in each layer may be manufactured by any material selected from aluminum, chrome, tungsten, tantalum, titanium, molybdenum, aluminum nickel alloy, and tungsten molybdenum alloy. The respective lead wiring (chip lead wiring 12 and/or data lead wiring 2 and/or gate lead wiring 3) may also have the layer structure similar to the repair line described above and be manufactured from the material for the repair line described above.

Apparently, in each embodiment described above, the electrical connection between the gate lead wiring 3 and/or data lead wiring 2 and the chip lead wiring 12 may be achieved by the structure such as the via hole 101, the conductive electrode 11 and the anisotropic conductive adhesive 15 as shown in FIG. 4. Use such the electrical connection may enable the electrical connection of the lead wirings and the electrical connection of repair lines to be achieved in a same processing step, simplifying the manufacture process. The respective conductive electrode 11 is preferably a transparent electrode manufactured from Indium Tin Oxide, Indium Zinc Oxide or Aluminum Zinc Oxide. Thus the transparent electrode and the pixel electrode may be formed simultaneously to simplify the process. The conductive electrode 11 may also be a common metal electrode, etc.

A method of manufacturing a liquid crystal panel of an embodiment of the invention comprises:
  forming an array substrate lead wiring and an array substrate repair line on an array substrate, wherein the array substrate repair line is overlapped with the array substrate lead wiring but insulated therefrom;
  forming a chip lead wiring and a chip repair line on a driving chip assembly, wherein the chip repair line is overlapped with the chip lead wirings but insulated therefrom; and
  electrically connecting the array substrate repair line and the chip repair line and electrically connecting the array substrate lead wiring and the chip lead wiring.

The liquid crystal display in which the open failure at the connection position of a driving chip assembly can be repaired can be obtained through the method of manufacturing a liquid crystal panel of an embodiment of the invention.

Next, the embodiments of the method of manufacturing liquid crystal panel of the invention will be described in detail below.

Embodiment 5

A method of an embodiment of the invention for manufacturing a liquid crystal panel comprises the following processes. In this embodiment, a gate lead wiring 3 is taken as an example of an array substrate lead wiring, and a gate lead wiring repair line 8 is taken as an example of an array substrate repair line.

Process 1: manufacturing an array substrate 20, which comprising the following steps.

Figure 8:
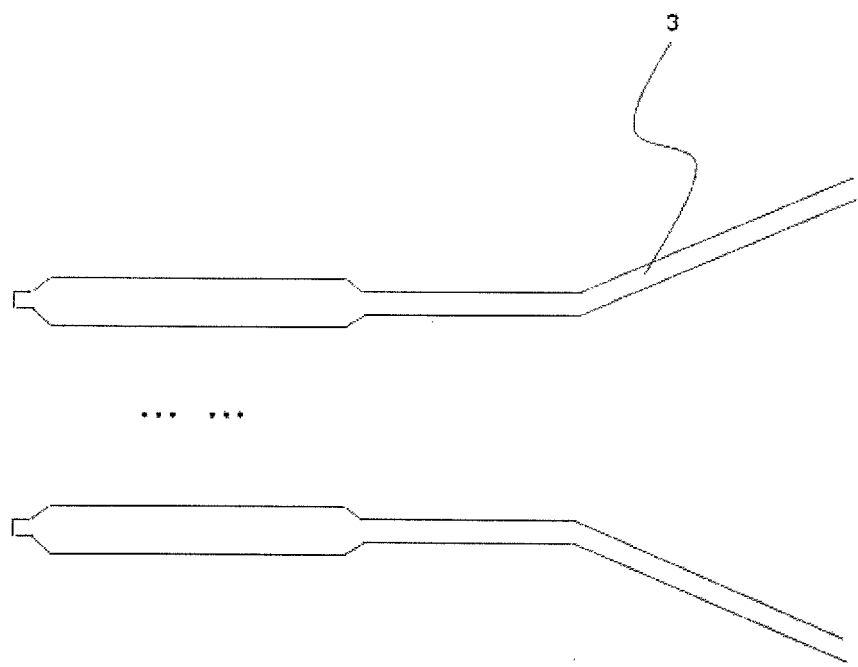
FIG. 8 is a schematic plan structure view of a connection position of a driving chip assembly of an array substrate after the step 1 in the manufacturing method for liquid crystal panel of the embodiment 5 of the invention.

Step 1, a gate metal layer is deposited on a base substrate (e.g., a glass substrate) of the array substrate, and a gate electrode (not shown) and the gate lead wiring 3 as shown in FIG. 8 are formed in the gate metal layer by a patterning process; the deposition method may use a magnetron sputtering method, the thickness of the gate metal layer is 1000 to 7000 Å, the material of the gate metal layer is generally aluminum, chrome, tungsten, tantalum, titanium, molybdenum, aluminum nickel alloy or tungsten molybdenum alloy, etc, or the gate metal layer has a multi-layer structure comprising thin films of materials mentioned above. The patterning process may include a photolithography process and a chemical corrosion process.

Step 2, a gate insulation layer and an amorphous silicon thin film are deposited on the glass substrate after step 1, and by a patterning process, a semiconductor layer (i.e., an active layer) pattern is formed on the gate electrode in the same layer as the gate lead wiring 3, the semiconductor layer at the position of gate lead wiring 3 is etched away: the gate insulation layer with the thickness of 1000 to 6000 Å and the amorphous silicon thin film with the thickness of 1000 to 6000 Å may be deposited by using a chemical vaporous deposition method. The material of the gate insulation layer is typically silicon nitride, and may also be silicon oxide silicon oxynitride, or the like. The amorphous silicon thin film is an example of an active layer for forming a thin film transistor.

Figure 9:
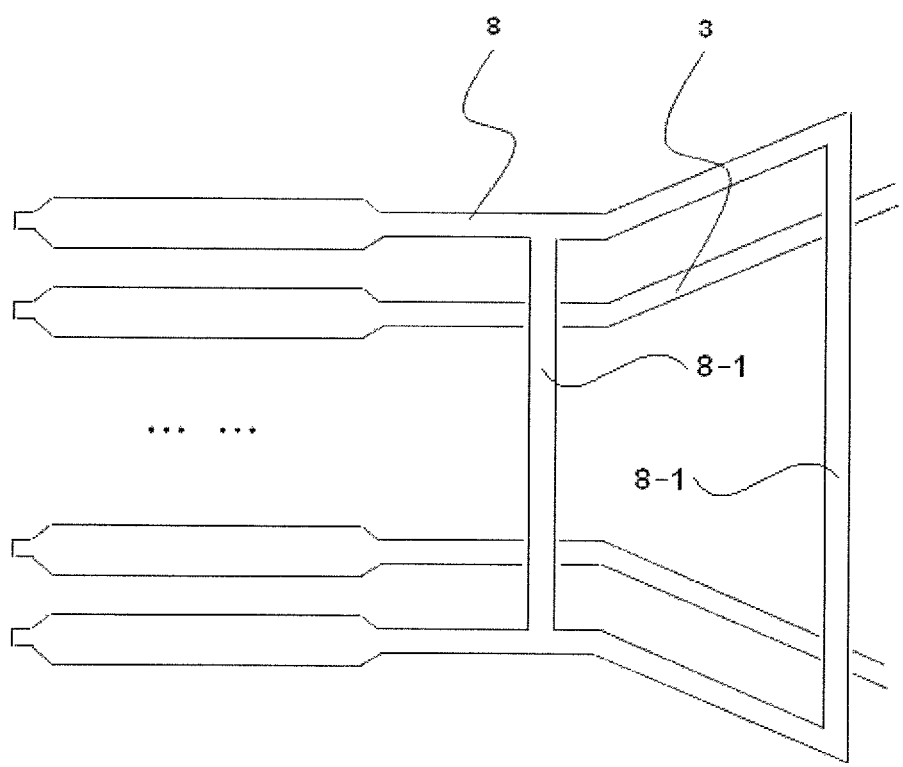
FIG. 9 is a schematic plan structure view of a connection position of a driving chip assembly of an array substrate after the step 3 in the manufacturing method for liquid crystal panel of the embodiment 5 of the invention.

Step 3, a data metal layer is deposited on the glass substrate after step 2 and a data lead wiring and the gate lead wiring repair line 8 are formed with the data metal layer by a patterning process, which achieves a structure as shown in FIG. 9 (the data lead wiring is not shown in FIG. 9 due to the position of which is far from the connection position of the driving chip assembly): the thickness of the data metal layer is 1000 to 7000 Å. This step form the data lead wiring and the gate lead wiring repair line 8 simultaneously so as to simplify the process.

Furthermore, in another example, the step 3 and step 2 may be combined into one step by using a half-exposure process which may use a mask plate such as a semi-transparent mask plate or a slit mask plate, etc.

Figure 10:
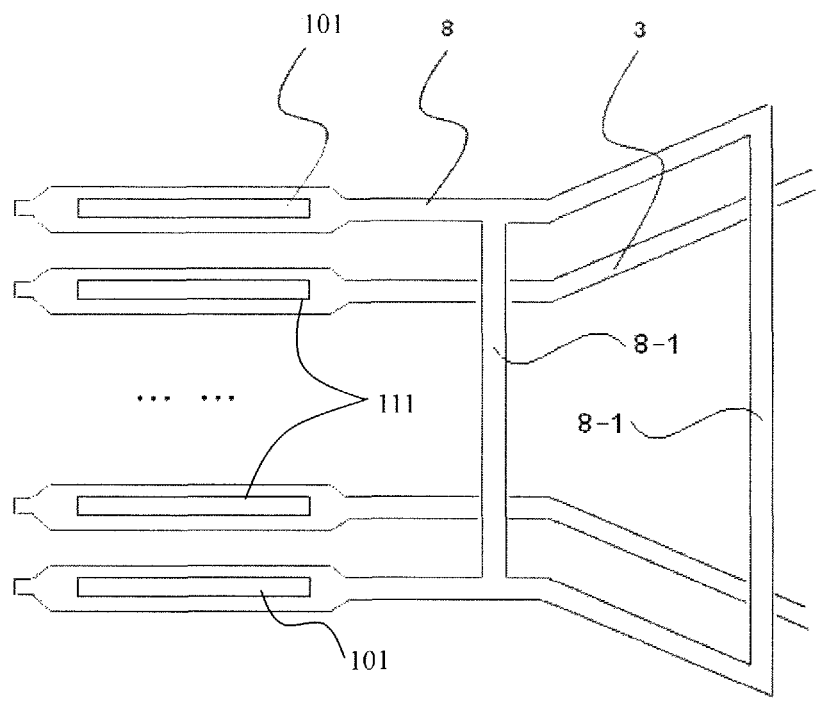
FIG. 10 is a schematic plan structure view of a connection position of a driving chip assembly of an array substrate after the step 4 in the manufacturing method for liquid crystal panel of the embodiment 5 of the invention.

Step 4, a protective layer is deposited on the glass substrate after step 3, and a via hole 10 is formed in the protective layer by a patterning process, resulting in the structure as shown in FIG. 10; the thickness of the protective layer is 1000 to 6000 Å and the material of it is typically silicon nitride or silicon dioxide. The via hole 101 is located at the end of the gate lead wiring repair line 8. Likewise, a via hole 111 located at the end of the gate lead wiring 3 may also be simultaneously formed in this step so as to simplify the process.

Figure 11:
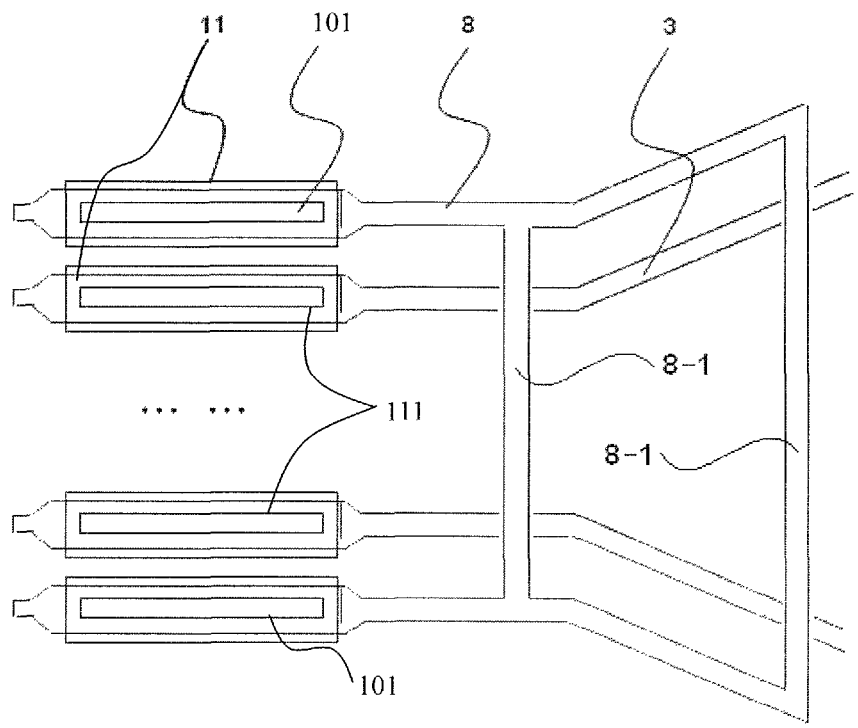
FIG. 11 is a schematic plan structure view of a connection position of a driving chip assembly of an array substrate after the step 5 in the manufacturing method for liquid crystal panel of the embodiment 5 of the invention.

Step 5, a conductive electrode layer 11 is deposited on the substrate after step 4, and a conductive electrode is formed at the end of the gate lead wiring repair line 8 described above by a patterning process, resulting in a structure as shown in FIG. 11; the conductive electrode 11 is preferably a transparent electrode, thus it may be formed in one step along with the pixel electrode. This transparent electrode is typically Indium Tin Oxide, Indium Zinc Oxide, Aluminum Zinc Oxide, or the like, the thickness of which is between 100 to 1000 Å. At the same time, the conductive electrode 11 located at the end of the gate lead wiring 3 may also be simultaneously formed in this step so as to simplify the process.

Process 2: manufacturing a driving chip assembly (apparently, this process may be performed at the same time as or prior to the process of manufacturing an array substrate), which comprises the following steps. In this embodiment, the driving chip assembly is used for driving the gate lead wirings.

Step 6, a metal thin film is deposited on a chip substrate 71 of the driving chip assembly and to form a chip lead wiring 12 by a patterning process. The chip substrate 71 may be made of polyimide resin, etc. The deposition of the metal thin film may be conducted by first sputtering an alloy film of nickel and copper and then electroplating to achieve a copper layer in an increased thickness. The examples of the patterning process comprise a photolithography and a chemical corrosion. The photolithography comprises coating photoresist on the copper layer, exposing, and developing, and forming a pattern protected by resist which is resistant to corrosion. The chemical corrosion comprises spaying etching liquid to obtain a delicate circuit pattern, followed by removing the resist and performing the oxidation prevention treatment to obtain the chip lead wiring.

Step 7, a chip insulation layer 16 (insulative resist film) is coated on the chip substrate after step 6.

Figure 12:
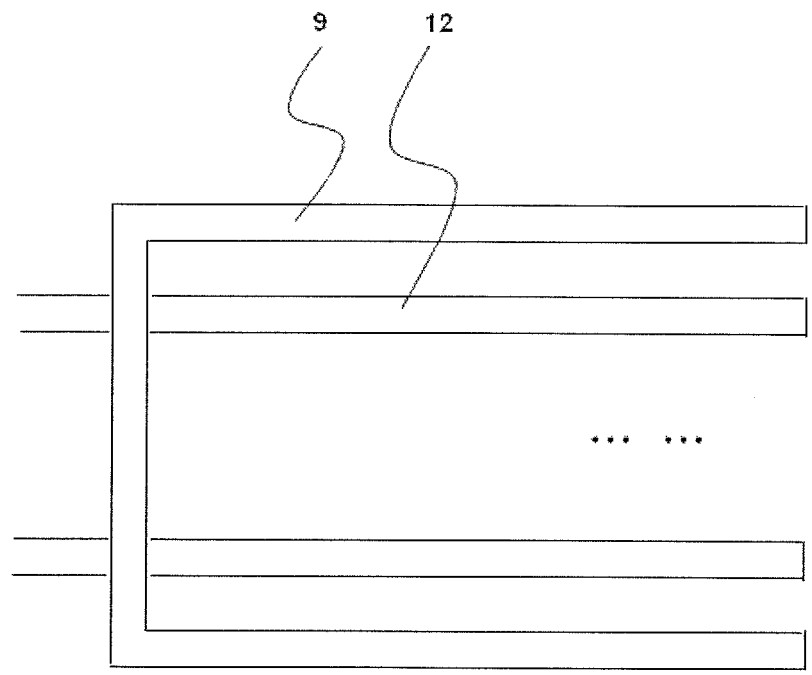
FIG. 12 is a schematic plan structure view of a connection position of a driving chip assembly of a driving chip assembly after the step 8 in the manufacturing method for liquid crystal panel of the embodiment 5 of the invention.

Step 8, as shown in FIG. 12, a metal thin film is deposited once again and a chip repair line 9 is formed by using a patterning process, wherein the chip repair line 9 and the chip lead wiring 12 are separated by the chip insulation layer 16.

Step 9, a via hole is manufactured in the chip insulation layer above the end of the chip lead wiring 12 by a patterning process to expose the end of the chip lead wiring.

Apparently, during the process of manufacturing the driving chip assembly, it may be also suitable to manufacture the chip repair line 9 first, then the chip insulation layer 16, next the chip lead wiring 12, and finally the via hole 191 in the chip insulation layer above the chip repair line 9 (as shown in FIG. 4).

Process 3: connecting the driving chip assembly 7 and the array substrate 20, which comprises the following steps.

Step 10, anisotropic conductive adhesive is coated on the conductive electrode 11 of the via hole 101 at the end of the gate lead wiring repair line 8 and the conductive electrode 11 of the via hole 111 at the end of the gate lead wiring 3.

Step 11, the driving chip assembly 7 is aligned by a alignment marker, after that, the electrical connection of the gate lead wiring repair line 8 and the chip repair line 9 and the electrical connection of the gate lead wiring 3 and the chip lead wiring 12 are achieved respectively by a pressure head, e.g., under the pressure of 0.1 to 0.4 MPa and the temperature of 100 to 200 degree Celsius, resulting in a structure as shown in FIG. 5.

Conducting balls 151 (e.g., gold particles or graphite particles, etc.) are contained in the anisotropic conductive adhesive 15, and the conducting balls 151 electrically connects the two metal lines after the chip repair line 9 and the gate lead wiring repair line 8 are pressed together; likewise, the electrical connection between the gate lead wiring 3 and the chip lead wiring 12 is also achieved with the conducting balls 151 in the anisotropic conductive adhesive 15.

Embodiment 6

A method of the embodiments of the invention for manufacturing a liquid crystal panel comprises the following processes. In the embodiment, a data lead wiring is taken as an example of an array substrate lead wiring and a data lead wiring repair line is taken as an example of an array substrate repair line.

Process 1: manufacturing an array substrate, which comprises the following steps.

Step 1, a gate metal layer is deposited on a base substrate of an array substrate (e.g., a glass substrate), and a gate electrode, a gate lead wiring and a data lead wiring repair line are formed in the gate metal layer by a patterning process.

Step 2, a gate insulation layer and a amorphous silicon thin film are deposited on the glass substrate after step 1, a semiconductor layer pattern is formed on the gate electrode by a patterning process, and the semiconductor layer at the positions of the gate lead wiring and the data lead wiring repair line is etched away. The amorphous silicon thin film is an example of an active layer for forming a thin film transistor.

Step 3, a data metal layer is deposited on the glass substrate after step 2, and the data lead wiring is formed in the data metal layer by a patterning process.

Step 4, a protective layer is deposited on the glass substrate after step 3, and in the protective layer, a via hole is formed above the end of data lead wiring repair line by a patterning process.

Step 5, a conductive electrode layer is deposited on the substrate after step 4, and a conductive electrode is formed in the via hole located at the end of the data lead wiring repair line by a patterning process.

Process 2: manufacturing a driving chip assembly, which comprises the following steps. In this embodiment, the driving chip assembly is used for driving the data lead wirings.

Step 6, a metal thin film is deposited on a chip substrate and to form a chip lead wiring by a patterning process.

Step 7, a chip insulation layer is coated on the driving chip assembly.

Step 8, a metal thin film is deposited once again, and a chip repair line is formed by using a patterning process.

Step 9, a via hole is manufactured in a chip insulation layer above the end of the chip lead wiring by a patterning process.

Process 3: connecting the driving chip assembly and the array substrate, which comprises the following steps.

Step 10, anisotropic conductive adhesive is coated on the conductive electrode of the via hole at the end of the data lead wiring repair line and the conductive electrode of the via hole at the end of the data lead wiring.

Step 11, the driving chip assembly is aligned by an alignment marker, and the electrical connection of the data lead wiring repair line and the chip repair line is achieved by a pressure head.

Embodiment 7

A method of an embodiment of the invention for manufacturing a liquid crystal panel comprises the following processes. In this embodiment, a gate lead wiring and a data lead wiring are taken as the examples of array substrate lead wirings, and a gate lead wiring repair line and a data lead wiring repair line are as examples of array substrate repair lines.

Process 1: manufacturing an array substrate, which comprises the following steps.

Step 1, a gate metal layer is deposited on the glass substrate of the array substrate, and a gate electrode, a gate lead wiring and a data lead wiring repair line are formed in the gate metal layer by a patterning process;

Step 2, a gate insulation layer and a amorphous silicon thin film are deposited on the glass substrate after step 2, a semiconductor layer pattern is formed on the gate electrode by a patterning process, and the semiconductor layer at the positions of the gate lead wiring and the data lead wiring repair line is etched away;

Step 3, a data metal layer is deposited on the glass substrate after step 2, and a data lead wiring and a gate lead wiring repair line are formed in the data metal layer by a patterning process;

Step 4, a protective layer is deposited on the glass substrate after step 4, and via holes above the end of the data lead wiring repair line and the end of gate lead wiring repair line are formed in the protective layer by a patterning process.

Step 5, a conductive electrode layer is deposited on the substrate after step 4, and conductive electrodes located at the end of the data lead wiring repair line and the end of the gate lead wiring repair line are formed by a patterning process.

Process 2: manufacturing a driving chip assembly, which comprises the following step. In this embodiment, the driving chip assemblies are formed respectively for driving the gate lead wiring and driving the data lead wiring.

Step 6, a metal thin film is deposited on the chip substrate to form a chip lead wiring by a patterning process.

Step 7, a chip insulation layer is coated on the driving chip assembly.

Step 8, a metal thin film is deposited once again, and a chip repair line is formed by using a patterning process.

Step 9, a via hole is manufactured in the chip insulation layer above the end of the chip lead wiring by a patterning process.

Process 3: connecting the driving chip assembly and the array substrate, which comprises the following step.

Step 10, anisotropic conductive adhesive is coated on the conductive electrodes of the via holes at the end of the data lead wiring repair line and the end of the gate lead wiring repair line.

Step 11, the driving chip assemblies are aligned by an alignment marker, and the electrical connections of the data lead wiring repair line and the gate lead wiring repair line respectively with the chip repair lines of the corresponding driving chip assemblies are achieved by a pressure head.

Furthermore, the method for repairing the open failure of the connection position of the driving chip assembly in the liquid crystal panel of the embodiments of the invention comprise the following steps.

Firstly, the open position 17 of the connection position of the driving chip assembly is determined.

Welding is performed at the overlapped position, on one side of the open position 17, of the array substrate repair line and the array substrate lead wiring to achieve the electrical connection between them, and the array substrate repair line is overlapped with but insulated from the array substrate lead wiring before the welding.

Welding is performed at the overlapped position, on the other side of the open position 17, of the chip repair line 9 and the chip lead wiring 12 to achieve the electrical connection between them, and the electrical connection between the corresponding chip lead wiring 12 on the driving chip assembly and the array substrate lead wiring are disconnected due to the open position 17, while the chip repair line 9 is overlapped with but insulated from the chip lead wiring 12 before the welding, and the chip repair line 9 and the array substrate repair line are connected electrically.

The specific embodiment of the repairing method will be described in detail below.

Embodiment 8

In this embodiment, a gate lead wiring is taken as an example of an array substrate lead wiring, and a gate lead wiring repair line is taken as an example of an array substrate repair line. Apparently, this embodiment is also suitable for a data lead wiring and a data lead wiring repair line.

Figure 13:
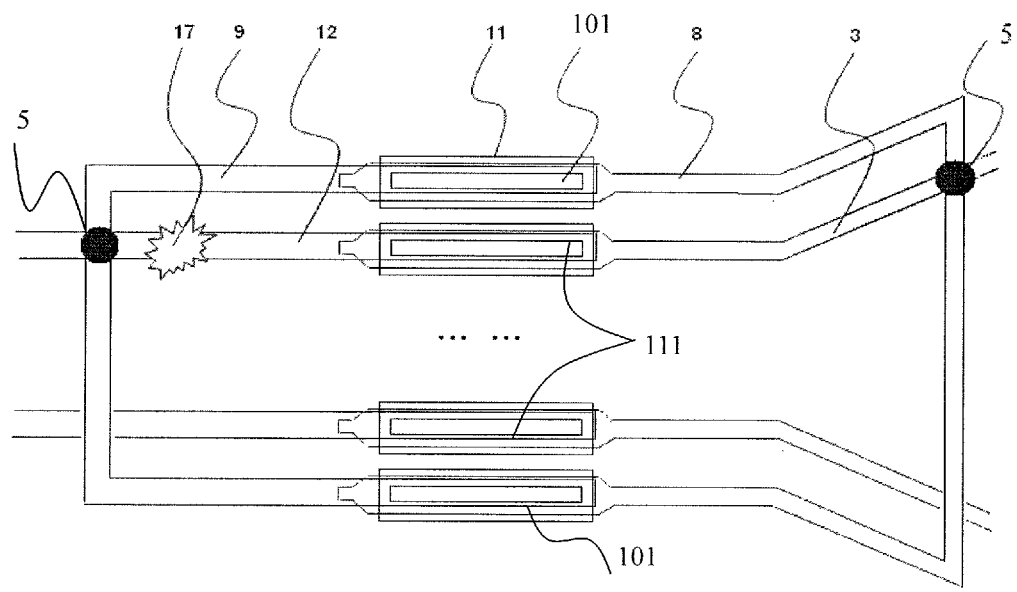
FIG. 13 is a schematic view of a repairing method for an open failure of connection position of a driving chip assembly in liquid crystal panel of the embodiment 8 of the invention.

As shown in FIG. 13, a method for repairing an open failure of a connection position of a driving chip assembly in the liquid crystal panel as shown in embodiment 1 comprises the following.

Firstly, finding the transverse or longitudinal bright line by a detecting process, and determining the coordinates of the bright line: locating the connection position of the driving chip assembly corresponding to the bright line, i.e., the connection position of the chip lead wiring 12 and the array substrate lead wiring (here taking the gate lead wiring 3 for example), based upon the known coordinates under a microscope; and determining the open position 17 of the connection position of the driving chip assembly.

Next, welding at the overlapped position 5 of the chip repair line 9 and the chip lead wiring 12 on one side of the open position 17 by using a laser device to melt, such that the electrical connection of the chip repair line 9 and the chip lead wiring 12 is achieved, wherein the wavelength of the laser for repair is 800 to 1000 nm and the energy is 100 to 200 nJ; also welding at the overlapped position 5, on the other side of the open position 17, of the gate lead wiring repair line 8 and the gate lead wiring 3 by using a laser device to melt, such that the electrical connection of the gate lead wiring repair line 8 and the gate lead wiring 3 is achieved, wherein the wavelength of the laser for repair is 800 to 1000 nm and the energy is 100 to 500 nJ; and after the weldings, the signals over the gate lead wiring 3 can be transferred through the repair line 8 and 9, removing the failure caused by open position 17.

Furthermore, another method for repairing an open failure of a connection position of a driving chip assembly of the liquid crystal panel in an embodiment of the invention comprises the following steps:

Determining the open position 17 of the connection position of the driving chip assembly;

When the open position 17 is located on the array substrate lead wiring, welding respectively at the two overlapped positions 5 of the two overlapping portions 8-1 of the array substrate repair line with the array substrate lead wiring on the two sides of the open position 17 to achieve the electrical connection of the array substrate lead wiring and the array substrate repair line. The electrical connection of the array substrate lead wiring and the corresponding chip lead wiring 12 on the driving chip assembly is disconnected due to the open position 17. The two overlapping portions 8-1 of the array substrate repair line are overlapped with but insulated from the array substrate lead wiring before the welding, and the two ends of the overlapping portions are connected respectively. The common ends after connection is electrically connected with the chip repair line 9 on the driving chip assembly, which is overlapped with but insulated from the chip lead wiring 12 before the welding;

When the open position is located on the chip lead wiring or at the electric connection position of the chip lead wiring and the array substrate lead wiring, welding at the overlapped position of any one of the overlapping portions of the array substrate repair line and the array substrate lead wiring on one side of the open position to achieve the electrical connection of the array substrate lead wiring and the array substrate repair line, and, welding at the overlapped position of the chip repair line and the chip lead wiring on the other side of the open position to achieve the electrical connection of the chip repair line and the chip line.

The method of the embodiment of the invention may repair the open failure of the connection position of the driving chip assembly of a liquid crystal panel, such that the waste products are reduced and the cost is decreased.

The specific embodiment of the repairing method will be described in detail below.

Embodiment 9

In this embodiment, a gate lead wiring is taken as an example of an array substrate lead wiring, and a gate lead wiring repair line is taken as an example of array substrate repair line. Apparently, this embodiment is also suitable for a data lead wiring and a data lead wiring repair line.

A method for repairing an open failure of a connection position of a driving chip assembly in the liquid crystal panel as illustrated in the embodiment 2 is similar to the repairing method of the embodiment 8. They differ in that different welding methods need to be selected according to the open position 17.

Figure 14:
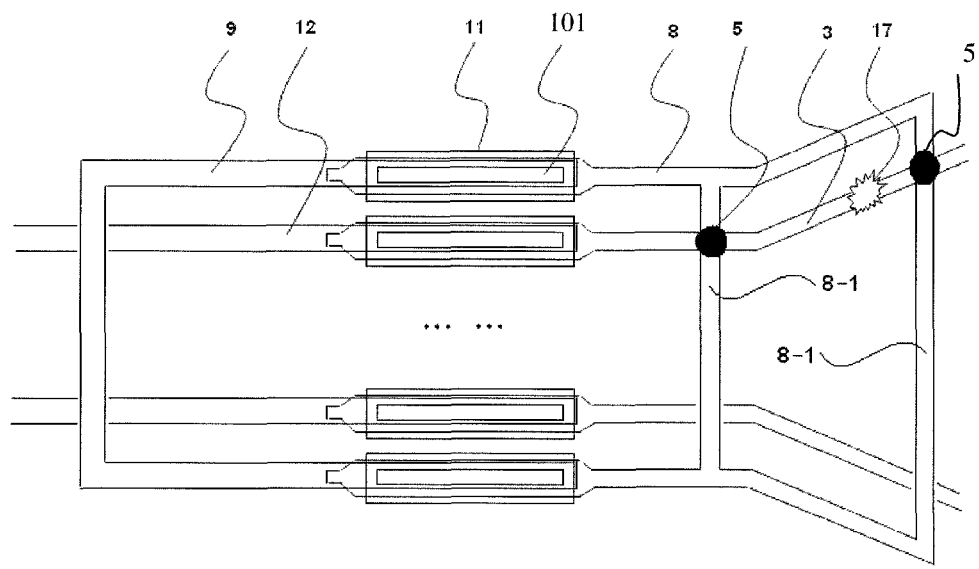
FIG. 14 is a schematic view of a repairing method for an open failure for a gate lead wiring of connection position of a driving chip assembly in liquid crystal panel of the embodiment 9 of the invention.
Figure 15:
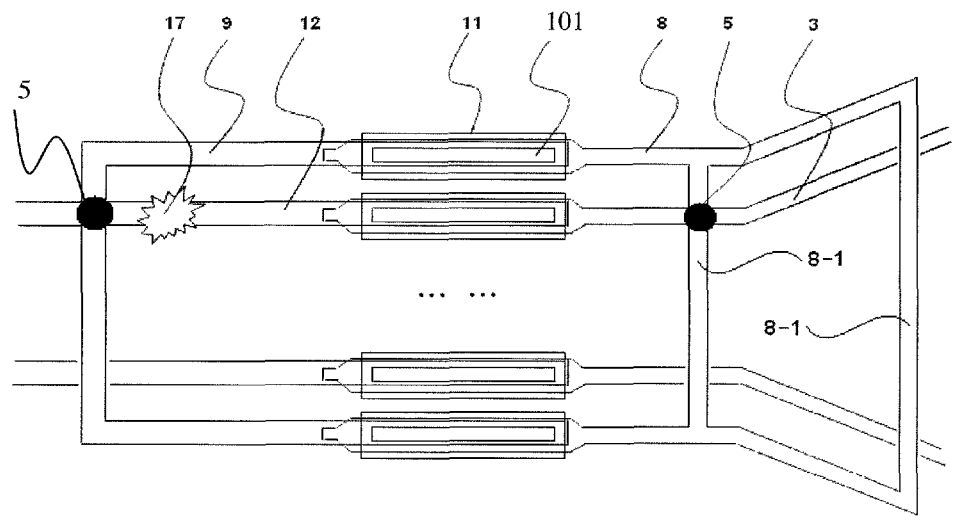
FIG. 15 is a schematic view of a repairing method for an open failure for a chip lead wiring of connection position of a driving chip assembly in liquid crystal panel of the embodiment 9 of the invention.
Figure 16:
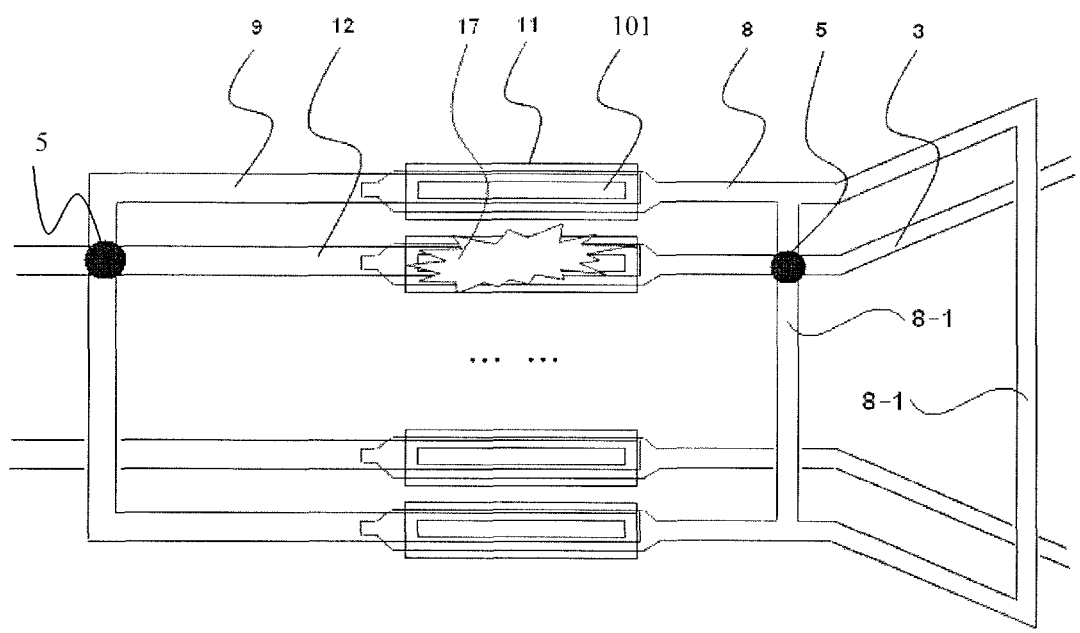
FIG. 16 is a schematic view of a repairing method for an open failure of an electric connection position between a gate lead wiring and a chip lead wiring at a connection position of a driving chip assembly of liquid crystal panel of the embodiment 9 of the invention.

As shown in FIG. 14, when the open position 17 is on the gate lead wiring 3 (i.e., between the two overlapping portions 8-1 of the gate lead wiring repair line 8), welding respectively at the two overlapped positions 5 of the two overlapping portions 8-1 of the gate lead wiring 3 and the gate lead wiring repair line 8, which are located at the two sides of the open position for repairing: in this situation, since the two welding are both performed on the array substrate, the parameters of the laser melting device need not to be adjusted during the welding process, which is easily operated; moreover, performing the laser-melting on the driving chip assembly 7 (particularly on the chip on film) tends to burn out the driving chip assembly 7, while the method of this embodiment can omit the welding on the driving chip assembly 7, reducing the possibility of the damage to driving chip assembly 7 during repairing;

When the open position 17, as shown in FIG. 15 or FIG. 16, is located on the chip lead wiring 12 or at the electric connection position of the chip lead wiring 12 and the gate lead wiring 3, the method similar to that of the embodiment 8 is used to repair, wherein there are two overlapped positions of the overlapping portions 8-1 of the gate lead wiring repair line 8 and the gate lead wiring 3, any of which may be welded.

The embodiments of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A liquid crystal panel, comprising:
    a driving chip assembly comprising a chip lead wiring and a chip repair line, which are overlapped but insulated from each other;
    an array substrate comprising an array substrate lead wiring and an array substrate repair line, which are overlapped but insulated from each other;
    wherein the driving chip assembly is mounted on the array substrate, the array substrate lead wiring and the corresponding chip lead wiring are connected electrically,
    the two ends of the chip repair line are electrically connected with the two ends of the corresponding array substrate repair lines respectively to form a closed annular line to form a closed annular line,
    the array substrate repair line comprises two overlapping portions which are overlapped with the array substrate lead wiring but insulated therefrom, and
    the two ends of the array substrate repair line, which are located at the same side of the array substrate lead wiring, of the two overlapping portions are connected respectively, and the common ends after connected are electrically connected with the corresponding two ends of the chip repair line.

2. The liquid crystal panel according to claim 1, wherein the array substrate lead wiring comprises a gate lead wiring, the array substrate repair line comprises a gate lead wiring repair line, and the gate lead wiring repair line and the gate lead wiring are insulated from each other through a gate insulation layer therebetween.

3. The liquid crystal panel according to claim 1, wherein the array substrate lead wiring comprises a data lead wiring, the array substrate repair line comprises a data lead wiring repair line, and the data lead wiring repair line and the data lead wiring are insulated from each other through a gate insulation layer therebetween.

4. The liquid crystal panel according to claim 1, wherein the array substrate lead wiring comprises a gate lead wiring and a data lead wiring, the array substrate repair line comprises a gate lead wiring repair line and a data lead wiring repair line; the gate lead wiring repair line is located in a same layer with the data lead wiring and is insulated from the gate lead wiring each other through a gate insulation layer; the data lead wiring repair line is located in the same layer as the gate lead wiring and is insulated from the data lead wiring through the gate insulation layer.

5. The liquid crystal panel according to claim 1, wherein the driving chip assembly comprises a chip on film or a chip on glass.

6. The liquid crystal panel according to claim 1, wherein the chip repair line is overlapped with one or more chip lead wirings, and the array substrate repair line is overlapped with one or more array substrate lead wirings.

7. The liquid crystal panel according to claim 1, wherein the driving chip assembly is mounted on the array substrate by anisotropic conductive adhesive, the array substrate repair line has a conductive electrode at its end, on which is provided the anisotropic conductive adhesive, and the anisotropic conductive adhesive is connected with the end of the chip repair line.

8. The liquid crystal panel according to claim 1, wherein the array substrate repair line and the chip repair line has a single layer structure or a composite layer structure of layers.

9. The liquid crystal panel according to claim 8, wherein the single layer structure or the composite layer structure is made from any material selected from aluminum, chrome, tungsten, tantalum, titanium, molybdenum, aluminum nickel alloy, and tungsten molybdenum alloy.

10. A method of manufacturing a liquid crystal panel comprising:
    forming an array substrate lead wiring and an array substrate repair line on an array substrate, wherein the array substrate repair line is overlapped with the array substrate lead wiring but insulated therefrom;
    forming a chip lead wiring and a chip repair line on a driving chip assembly, wherein the chip repair line is overlapped with the chip lead wiring but insulated therefrom; and
    mounting the driving chip assembly on the array substrate to form an electrical connection between the two ends of the array substrate repair line and the corresponding two ends of the chip repair line and the electrical connection of the array substrate lead wiring and the chip lead wiring is formed,
    wherein the array substrate repair line comprises two overlapping portions which are overlapped with the array substrate lead wiring but insulated therefrom, and
    the two ends of the array substrate repair line, which are located at the same side of the array substrate lead wiring, of the two overlapping portions are connected respectively, and the common ends after connected are electrically connected with the corresponding two ends of the chip repair line.

11. The method of manufacturing a liquid crystal panel according to claim 10, wherein the array substrate lead wiring comprises a gate lead wiring, the array substrate repair line comprises a gate lead wiring repair line, wherein the step of the forming the array substrate lead wiring and the array substrate repair line on the array substrate comprises:
    forming a metal layer for a gate lead wiring on the array substrate, and forming the gate lead wiring with the metal layer for the gate lead wiring by a patterning process;
    forming a gate insulation layer on the array substrate; and
    forming a metal layer for a data lead wiring on the gate insulation layer, and forming a data lead wiring and the gate lead wiring repair line simultaneously with the metal layer for the data lead wiring by a patterning process.

12. The method of manufacturing a liquid crystal panel according to claim 10, wherein the array substrate lead wiring comprises a data lead wiring, the array substrate repair line comprises a data lead wiring repair line, wherein the step of forming the array substrate lead wiring and the array substrate repair line on the array substrate comprises:
    forming a metal layer for a gate lead wiring on the array substrate, and forming the gate lead wiring and the data lead wiring repair line simultaneously with the metal layer for the gate lead wiring by a patterning process;
    depositing a gate insulation layer on the array substrate; and
    depositing a metal layer for a data lead wiring on the gate insulation layer, and forming the data lead wiring with the metal layer for the data lead wiring by a patterning process.

13. The method of manufacturing a liquid crystal panel according to claim 10, wherein the step of forming the chip lead wiring and the chip repair line on the driving chip assembly comprises:
    forming a chip lead wiring metal layer on a substrate of the driving chip assembly, and forming the chip lead wiring by the chip lead wiring metal layer by a patterning process;
    forming a chip insulation layer on the driving chip assembly; and
    forming a metal layer for chip repair line on the chip insulation layer, and forming the chip repair line by the metal layer for the chip repair line by a patterning process.

14. The method of manufacturing a liquid crystal panel according to claim 10, wherein the step of forming chip lead wiring and chip repair line on the driving chip assembly comprises:
    forming a metal layer for chip repair line on a substrate of the driving chip assembly, and forming the chip repair line by the metal layer for the chip repair line by a patterning process;
    forming a chip insulation layer on the driving chip assembly; and
    forming a chip lead wiring metal layer on the chip insulation layer, and forming the chip lead wiring by the chip lead wiring metal layer by a patterning process.

15. The method of manufacturing a liquid crystal panel according to claim 10, wherein the step of forming the electrical connection of the array substrate repair line and the chip repair line comprises:
    mounting the driving chip assembly on the array substrate by anisotropic conductive adhesive to form the electrical connection of the chip repair line and the array substrate repair line.

16. A method of repairing an open failure of a connection position of the driving chip assembly of the liquid crystal panel as claim 1 comprising:
    determining an open position of the connection position of driving chip assembly;
    welding at the overlapped position, which is on one side of the open position, of the array substrate repair line and the array substrate lead wiring to achieve the electrical connection between them;
    welding at the overlapped position, which is on the other side of the open position, of the chip repair line and the chip lead wiring to achieve the electrical connection between them, wherein the electrical connection between the chip lead wiring and the array substrate lead wiring is disconnected due to the open position.

17. The method of repairing an open failure of a connection position of the driving chip assembly of the liquid crystal panel according to claim 16, wherein the welding is achieved by laser-melting.

18. A method of repairing an open failure of a connection position of the driving chip assembly of the liquid crystal panel according to claim 1 comprising:
 determining an open position of the connection position of the driving chip assembly;
 when the open position is located on the array substrate lead wiring, welding at the two overlapping portions, which are on the two sides of the open position, of the two overlapped positions of the array substrate lead wiring and the array substrate repair line respectively to achieve an electrical connection of the array substrate lead wiring and the array substrate repair line, wherein the electrical connection between the array substrate lead wiring and the chip lead wiring on the driving chip assembly is disconnected due to the open position;
 when the open position is located on the chip lead wiring or located at the electric connection position of the chip lead wiring and the array substrate lead wiring, welding at the overlapped position, which is on one side of the open position, of either of the overlapping portions of the array substrate repair line and the array substrate lead wiring to achieve the electrical connection of the array substrate lead wiring and the array substrate repair line, and welding at the overlapped position, which is on the other side of the open position, of the chip repair line and the chip lead wiring to achieve the electrical connection of the chip repair line and the chip line.

19. The method of repairing an open failure of a connection position of the driving chip assembly of the liquid crystal panel according to claim 18, wherein the welding is achieved by laser-melting.

* * * * *